United States Patent
Rao et al.

(10) Patent No.: US 10,445,479 B2
(45) Date of Patent: Oct. 15, 2019

(54) SPATIOTEMPORAL CREDENTIAL LEAK DETECTION TO PREVENT IDENTITY FRAUD USING A LOG MANAGEMENT SYSTEM

(71) Applicant: FORTINET, INC., Sunnyvale, CA (US)

(72) Inventors: Santosh Rao, San Jose, CA (US); Wenjun Cai, Union City, CA (US); Partha Bhattacharya, Cupertino, CA (US)

(73) Assignee: Fortinet, Inc., Sunnyvale, CA (US)

( * ) Notice: Subject to any disclaimer, the term of this patent is extended or adjusted under 35 U.S.C. 154(b) by 58 days.

(21) Appl. No.: 15/721,908

(22) Filed: Sep. 30, 2017

(65) Prior Publication Data

US 2018/0189467 A1    Jul. 5, 2018

Related U.S. Application Data

(63) Continuation-in-part of application No. 15/396,403, filed on Dec. 30, 2016.

(51) Int. Cl.

| | |
|---|---|
| *G06F 21/31* | (2013.01) |
| *H04L 29/06* | (2006.01) |
| *H04W 4/02* | (2018.01) |
| *G06F 21/57* | (2013.01) |

(Continued)

(52) U.S. Cl.
CPC .......... *G06F 21/316* (2013.01); *G06F 21/552* (2013.01); *G06F 21/57* (2013.01); *H04L 63/08* (2013.01); *H04L 63/107* (2013.01); *H04L 63/1408* (2013.01); *H04L 67/04* (2013.01); *H04L 67/12* (2013.01); *H04L 67/18* (2013.01); *H04L 67/22* (2013.01); *H04W 4/023* (2013.01); *G06F 2221/2111* (2013.01)

(58) Field of Classification Search
CPC ...... G06F 21/316; G06F 21/57; G06F 21/552; G06F 2221/2111; H04L 67/04; H04L 67/18; H04L 67/12; H04L 63/1408; H04L 63/08; H04L 67/22; H04L 63/107; H04W 4/023

See application file for complete search history.

(56) References Cited

U.S. PATENT DOCUMENTS

| 8,504,411 B1 | 8/2013 | Subasic | |
|---|---|---|---|
| 2005/0216955 A1* | 9/2005 | Wilkins | H04L 63/083 726/23 |

(Continued)

*Primary Examiner* — Michael A Keller
(74) *Attorney, Agent, or Firm* — Law Office of Dorian Cartwright; Dorian Cartwright

(57) ABSTRACT

Metadata is received for different log events, from a plurality of regional controller nodes, implemented at least partially in hardware and geographically-dispersed around the data communication network for proximity to network devices. Each of the log events is reported by the network devices to a regional collector node of the plurality of regional controller nodes. Log events concerning a user authenticating to a network device that is geographically proximate to the user and comprising at least user identity aspect and a location aspect for specific users of stations serviced by the network devices, are detected. Feasibility of location changes can be determined to identify possible identity theft.

18 Claims, 6 Drawing Sheets

(51) Int. Cl.
*H04L 29/08* (2006.01)
*G06F 21/55* (2013.01)

(56) References Cited

U.S. PATENT DOCUMENTS

| | | | |
|---|---|---|---|
| 2009/0089869 A1* | 4/2009 | Varghese | G06F 21/31 |
| | | | 726/7 |
| 2010/0279656 A1 | 11/2010 | Hazzani | |
| 2011/0185055 A1 | 7/2011 | Nappier | |
| 2014/0211961 A1 | 7/2014 | Koch | |
| 2015/0302411 A1* | 10/2015 | Bondesen | G06Q 20/20 |
| | | | 705/72 |
| 2016/0105801 A1 | 4/2016 | Wittenberg et al. | |
| 2016/0212228 A1 | 7/2016 | Arkin | |
| 2017/0213025 A1 | 7/2017 | Srivastav et al. | |
| 2018/0018747 A1* | 1/2018 | Krishnan | G06Q 50/265 |

* cited by examiner

SPATIOTEMPORAL CREDENTIAL LEAK DETECTION TO PREVENT IDENTITY FRAUD USING A LOG MANAGEMENT SYSTEM

CROSS-REFERENCE TO RELATED APPLICATIONS

This application is a continuation-in-part of U.S. patent application Ser. No. 15/396,403 filed Dec. 30, 2016, entitled USER AND IOT (INTERNET OF THINGS) APPARATUS TRACKING IN A LOG MANAGEMENT SYSTEM by Partha Bhattacharya and Santosh Rao, the content of which is incorporated herein by reference in its entirety.

FIELD OF THE INVENTION

The invention relates generally to computer networking improvements, and more specifically, to prevent identity fraud with spatiotemporal credential leak detection using a log management system on a computer network.

BACKGROUND

Identify fraud is a growing concern given the recent proclivity of compromised personal information from Internet-based hacking. Further, digital transactions make it possible for thieves to quickly maximize purchases before an identity theft can be detected.

Separately, the field of security information and event management (SIEM) is generally concerned with collecting data from networks and networked devices that reflects network activity and/or operation of the network devices, and analyzing the data. For example, a reported event can be triggered when a user logs on to a device, uploads files, or moves between access points, makes a VPN (virtual private networking) connection, or connects to a cloud application.

Problematically, there is currently no correlation between the information available through disparate log systems, in part because of the voluminous amount of information collected by SIEM systems for unrelated purposes.

Therefore, what is needed is a robust SIEM system to merge various metadata for different events to prevent identity theft using a log management system. Changes in locations for the underlying identities can be tracked among log events at different times to detect anomalies indicative of identify theft.

SUMMARY

These shortcomings are addressed by the present disclosure of methods, computer program products, and systems for reporting log events to a central log service from distributed nodes to detect identify theft.

In one embodiment, metadata is received for different log events, from a plurality of regional controller nodes, implemented at least partially in hardware and geographically-dispersed around the data communication network for proximity to network devices. Each of the log events is reported by the network devices to a regional collector node of the plurality of regional controller nodes. Log events concerning a user authenticating to a network device that is geographically proximate to the user and comprising at least user identity aspect and a location aspect for specific users of stations serviced by the network devices, are detected.

In another embodiment, the metadata is parsed for each of the detected log events to expose part of an identity context and a current location. The identity context part is combined with one or more previous identity context parts of a specific user record for each of the reported events based on user identity aspects of the identity context part.

In yet another embodiment, a location and a log event time can be determined for the specific user based on user location aspect of the parsed log data. The determination comprises at least a mapping for a public IP address to a private MAC address exposed by a regional collector node. A specific user identity context record for the user of a plurality of user identify context records with the location and the log event time, can be updated. The specific user identity context comprises at least one previous location at least one previous time.

Possible modes of transport are identified by comparing the location for the specific user to a trend of previously determined user locations for the specific user stored in relation to previously reported log events to calculate a change of location over time. Identified possible transport modes can be analyzed against actually available for the user between the location and past locations, during a period between the log event time and at least one previous log event time. Responsive to identifying an anomaly between the possible modes of transport and the actual available modes of transport available for the user between the location and the at least one previous location, a notification of potential identify theft can be sent.

Advantageously, log events are leveraged to prevent or limit identity theft.

BRIEF DESCRIPTION OF THE SEVERAL VIEWS OF THE DRAWINGS

In the following figures, like reference numbers are used to refer to like elements. Although the following figures depict various examples of the invention, the invention is not limited to the examples depicted in the figures.

DETAILED DESCRIPTION

The present invention provides methods, computer program products, and systems for reporting log events to a central log service from distributed nodes to detect identify theft. One of ordinary skill in the art will recognize that many other scenarios are possible, given the present disclosure, as discussed in more detail below.

Systems to Prevent Identify Fraud Using Log Events (FIGS. 1-4)

FIG. 1A is a high-level block diagram illustrating a system 100 to report log events to a central log service from distributed nodes to detect identify theft, according to one embodiment. The system 100 comprises a central log manager 110, (regional) collector nodes 120A-B, network devices 130A-D, and POS stations 102A,B.

Figure 1:
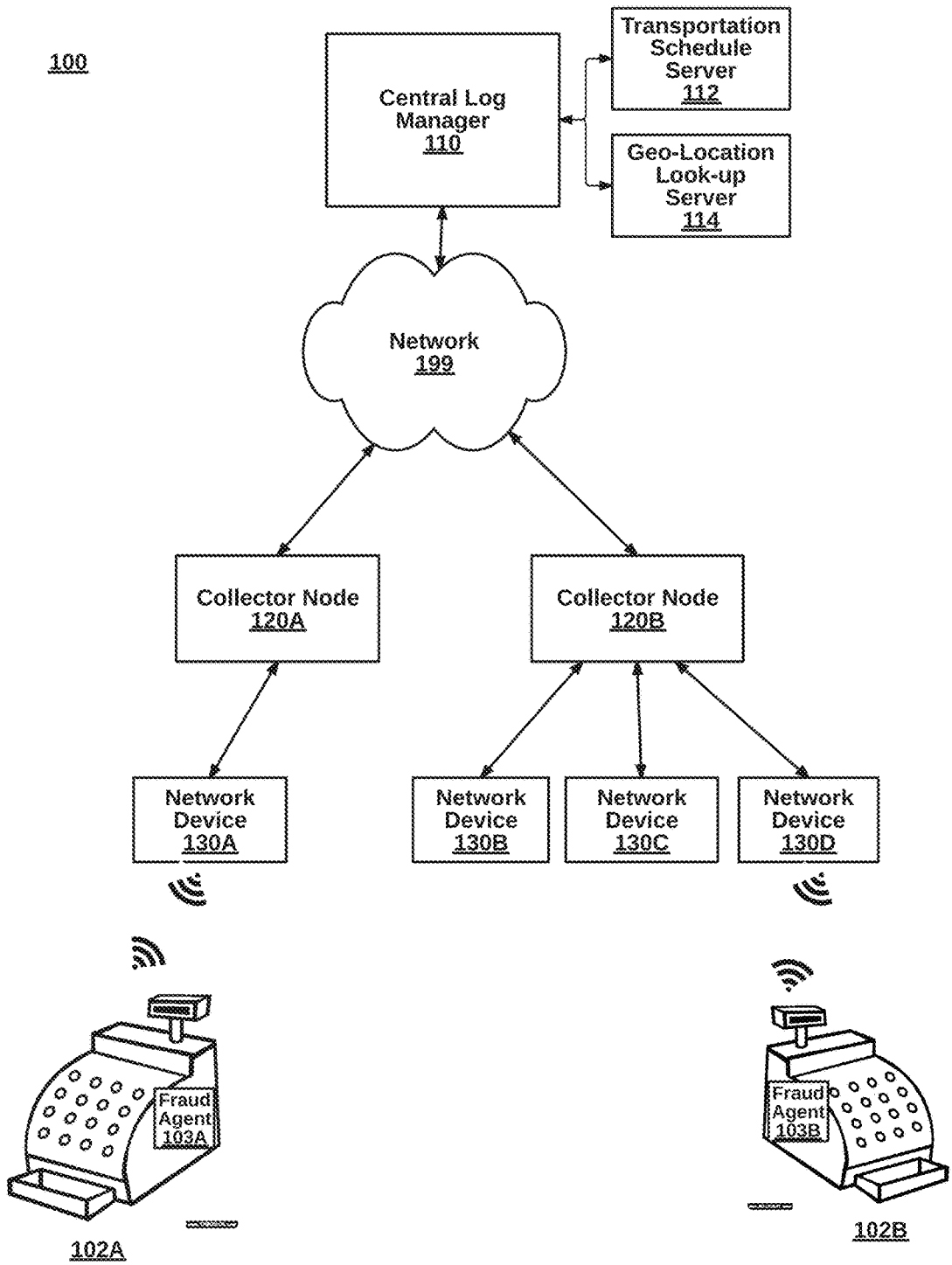
FIG. 1 is a high-level block diagram illustrating a system to detect identify fraud from reported log events, according to one embodiment.

A specific user can be identified within the network 199 from the POS station 102A at a first location served by the network device 130A in FIG. 1 at a first time, and from the POS station 1012B at a second location served by the network device 102B, at a subsequent time. Alternatively, just one of the identifications occurs at a POS device, to conduct a financial transaction, while the other identification involves a network contact without a financial transaction (e.g., gaming, VOIP or Internet browsing). As a result, identity theft involving a financial transaction can be identified by comparison to either an earlier or a network contact relative to a financial transaction. Generally, if there is no feasible mode of transport available to the user to travel between the two locations, one embodiment determines there to be an anomaly that could amount to identify theft.

As used herein, a feasible mode of transport concerns a calculated rate of travel to get from POS device 102A to POS device 120B. One embodiment configures user-define feasibility through security or identity theft rules or policies set by an entity. In one case, the rate of travel between a location in the United States and a location in Russia cannot be accomplished even by airplane (e.g., 5 minutes). In another case, the rate of travel is feasible, but the actual schedule of airplanes fetched from a transportation schedule server 112 does fall within the alleged travel time. In yet another case, the rate of travel can be accomplished by a train and boat, but the actual availability of trains and boats to travel the distance, but the complexity is not likely (e.g., 10 connections or $10,000 in travel expenses). In a final non-limiting example, a geographical fence can be set to overrule feasibility (e.g., no financial transactions allowed in Russia). Location changes can occur between countries, within a country, or even within neighborhoods of a particular city. Many other implementation-specific cases are possible.

The central log manager 110 generally analyzes and stores event records received from collection nodes 120A-B. In one embodiment, the central log manager tracks user locations on the network 199 based on log data from events. From historical locations, the trends can be determined relative to a current location.

If a change in locations violates security rules, the central log manager 110 can notify network administrators or security personnel, depending upon the circumstances. For example, a user that is always logging into the system through a laptop computer, but then breaks that trend by logging into the system through a smartphone. In another example, a user previously located in California 5 minutes ago, should not be currently located in Russia.

The central log manager 110 merges log data from multiple different events to develop a user context for identification. Thus, the user context is updated by cross-correlating various information from events because identification attributes are different for different events. In particular, DHCP logs provide IP address, MAC address and host name, but not a user. Active Directory authentication logs provide IP address, user and location but not host name or MAC address. Wireless LAN logs provide MAC address, user and location but not host name. Router layer 2 or 3 forwarding tables provide MAC address and location, but no IP address, host name or user. In an embodiment, names of users and IoT apparatus are stored on a database along with user names for different services (e.g., a VPN user name is correlated to a legal name). Example event types include a Windows or Unix logon event, an Active Directory logon event, a layer 2 forwarding table event, a layer 3 routing table event, a firewall event, a DHCP log event, a VPN authentication event, a VOIP phone event, and a wireless LAN event. A name used for one of the events can be cross-references with a database storing an actual name of a user. Many variations are possible, some of which are shown below with respect to FIG. 5.

In still another embodiment, the central log manager 110 pre-processes user context information to selectively updates database records use store location information to conserve resources. Further, the collector nodes 120A-B pre-process log event information to selectively update the central log manager 110 to avoid updates of duplicative material.

The central log manager 110 can on the same LAN or be outside of a firewall. The central log manager 110 can be a FortiSIEM device by Fortinet, Inc. of Sunnyvale, Calif., in one embodiment. Additional example embodiments of the central log manager 110 are discussed below in relation to FIG. 2.

The collector nodes 120A-B can be geographically (or logically) dispersed data collectors that are located proximate to the underlying network devices 130A-D, in some embodiments. The collector nodes 120A-B can be connected to the network devices 130A-D on a LAN, or the collector nodes 120A-B can be cloud-based or otherwise exist outside of a firewall on a LAN. The collector nodes 120A-B can be on a common LAN (single-entity system) or on different LANs (e.g., multiple entity system with software as a service, or SaaS). In some aspects, events are pushed to the collector nodes 120A-B. In other aspects, the collect nodes 120A-B are notified by other devices of errors, such as by a wireless station attempting to connect. In another aspect, the collector nodes 120A-B perform test transactions against the network devices 130A-D and report errors in event records.

In the example of FIG. 1, collector node 120A services one network device while collector node 120B has a higher device count of three network devices. The network device 130A could be a gateway that generates lots of event records while network devices 130B-D are rarely used. Non-critical devices may create less event reporting than a single device. Many variations are possible In one embodiment, the network devices 130A-D (or an associated central controller) stores mappings between a public IP address and a private LAN address. When a network device operates as a gateway (e.g., an AP has a public IP address while POS devices have a masked LAN address).

The network devices 130A-D can be, for example, a gateway device, a firewall, an access point, a switch, a router, a hub, a repeater, a server, a controller, a wireless station, or any other device on the network 199 or within a LAN. The network devices 130A-D can be implemented in a personal computer, a laptop computer, a tablet computer, a smart phone, a mobile computing device, a server, a cloud-based device, a virtual device, an Internet appliance, or any of the computing devices described herein (see e.g., FIG. 6). No client configuration or download is needed for this particular technique, although other aspects of log management may require downloads to the network devices 130A-D. For instance, an operating system patch or separate application can detect error events through intercepting messages, and collect data for sending to the collector nodes 120A-B.

The POS devices 102A,B can be a networked cash register, a server that stores all transactions for a store (e.g., all Best Buy stores in San Jose, Calif.). Alternatively, the POS devices 102A,B can be a mobile device or smart phone capable of conducting financial transactions (e.g., PayPal app on a smart phone). Non-POS devices can include a smart phone that logs into a cloud service or makes a VPN connection (e.g., Dropbox, Office 365, e-mail services, or Citrix applications).

One embodiment includes fraud agents 103A,B integrated within an OS or as a separate application on POS devices 102A,B to assist in even logging. One implementation recognizes and flags financial transactions for analysis.

Network 199 provides a data channel for components of the system 100. Specifically, the network device 130A is coupled to the collector node 120A and the network devices 130B-D are coupled to the collector node 120B, through wired or wireless channels. In, turn, the collector nodes 120A-B are coupled to the WAN 199 preferably through a wired connection, but can be wireless. The central log manager 110 is also coupled to the WAN 199, preferably through a wired connection. Additional network components can also be part of the system 100, such as firewalls, virus scanners, routers, switches, application servers, databases, and the like.

Figure 7:
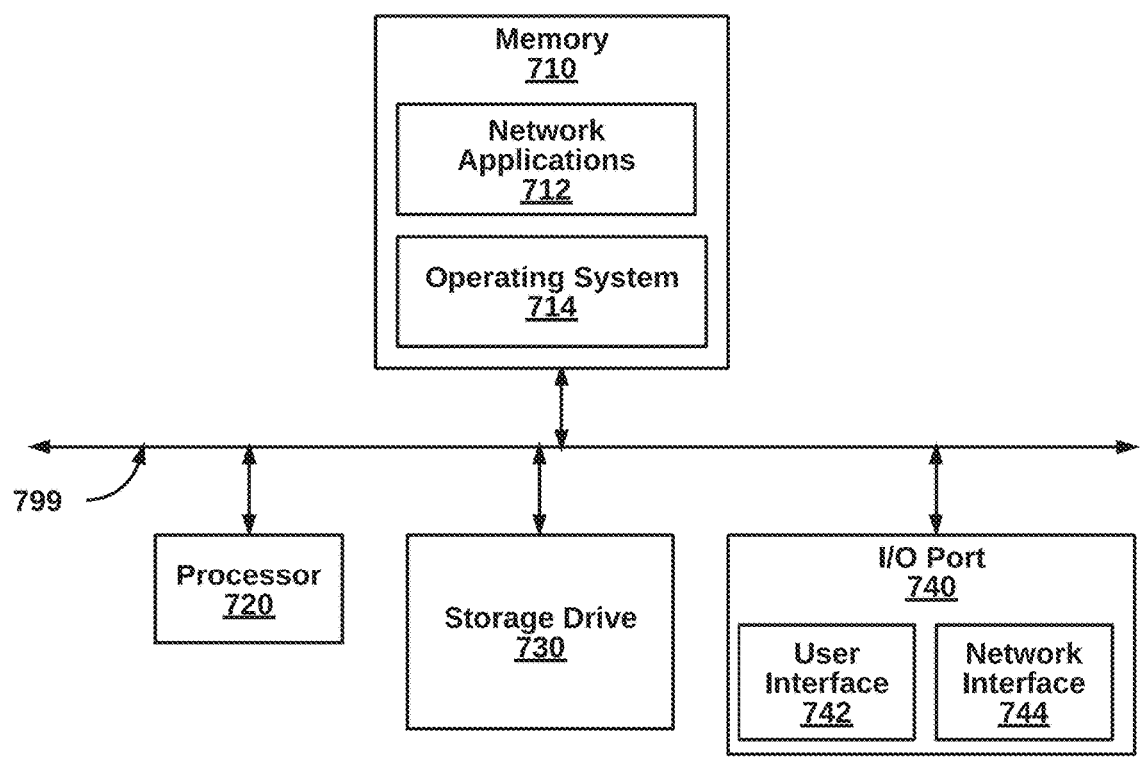
FIG. 7 is a block diagram illustrating an example computing device, according to one embodiment.

Generally, the network components of the system 100 can be implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 7).

Figure 2:
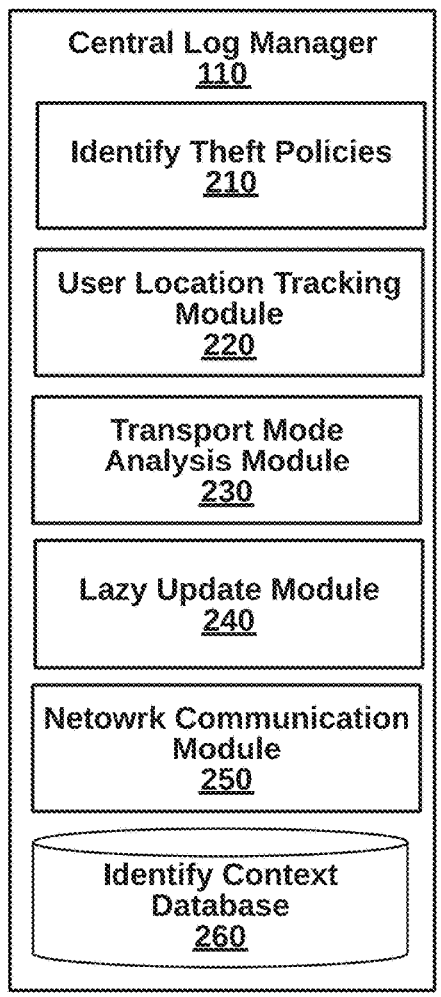
FIGS. 2-3 are more detailed block diagrams illustrating internal components of a central log manager and a collector node from the system of FIG. 1, according to some embodiments.

FIG. 2 is a more detailed block diagram illustrating the central log manager 110 of the system 100, according to one embodiment. The central log manager 110 comprises identify theft policies 210 with general or custom rules or policies.

A user tracking module 210 maintains a location history for individual IoT apparatus and for specific users in the identity context database 260. For example, a table or relational database record can list time and data stamps (e.g., last seen time), per location, for each individual user. The stored data can be pre-processed in the collector node 120 to conserve computing resources of the central log manager 110. As such, the received data has been processed from log data in order to extract appropriate metadata. Some embodiments, perhaps when serving fewer network devices, process log data locally.

In one embodiment, trends emerge by analyzing historical locations to determine whether or not a current location is an anomaly. Dynamic rules can be based on a current trend, or window or locations or other activities.

Once suspicious activity has been identified as noncompliant with policies, a security action can be performed. For instance, a user or entity can be notified of potential identify theft. Numerous variations are possible.

The lazy update module 240 selectively updates the use database 260 only if relevant metadata has changed for a user or device in order to conserve resources. Redundant data is quickly identified and eliminated. By contrast, embodiments with fast update modes selectively updates the identify context database 260 as soon as any change in relevant metadata is observed like an access point or location change.

Additionally, the identify context database 260 can store tables that correlate official names against user names (e.g., Jazzmin Ramirez legal employee name known to a company correlated to jramirez, the user name for Active Directory or other services). Some embodiments use a remote database physically separate from the central log manager 110. The IoT and user database 260 can be subject to online storage processes, including data compression, data security, and data mirroring.

The network communication module 250 includes APIs, networking software and hardware ports and protocols, and radios needed to communicate with access points, stations, external databases and severs, and the like.

Figure 3:
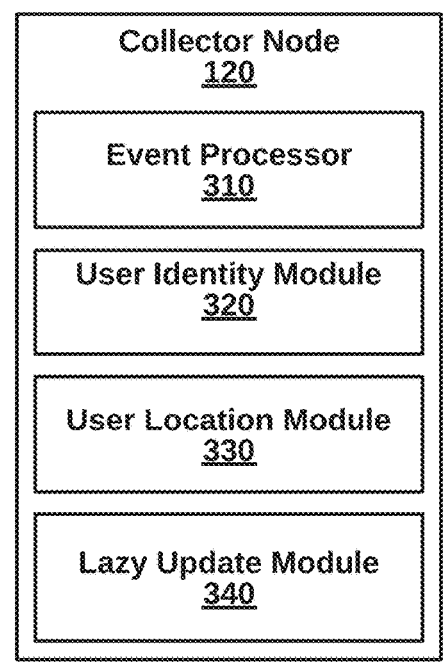

FIG. 3 is a more detailed block diagram illustrating a collector node 120 (collectively representing the collector nodes 120A-B) of the system 100, according to one embodiment. The collector node 120 comprises an event processor 310, a user identity module 320, a user location module 330, and a lazy update module 340. The internal components can be implemented in hardware, software, or a combination of both.

The event processor 310 parses event logs. A queue can store incoming events in a first come, first out, basis. High priority events skip ahead in the queue, in some implementations. Some events are deleted without being queued. Some embodiments of the event processor 310 include the functionality of the user identity module 320 and a user location module 330 as sub-modules.

The user identity module 320 analyzes the metadata for reported events to identify an IoT device or an individual user. While conventional systems are geared towards identifying a problem, the user identity module 320 is unconcerned with the issue. Instead, the user identity module 320 can be triggered by log events contributing relevant user and/or location parameters. The embodiment of FIG. 1 shows an alternative in which the central log manager 110 performs this task.

Figure 4:
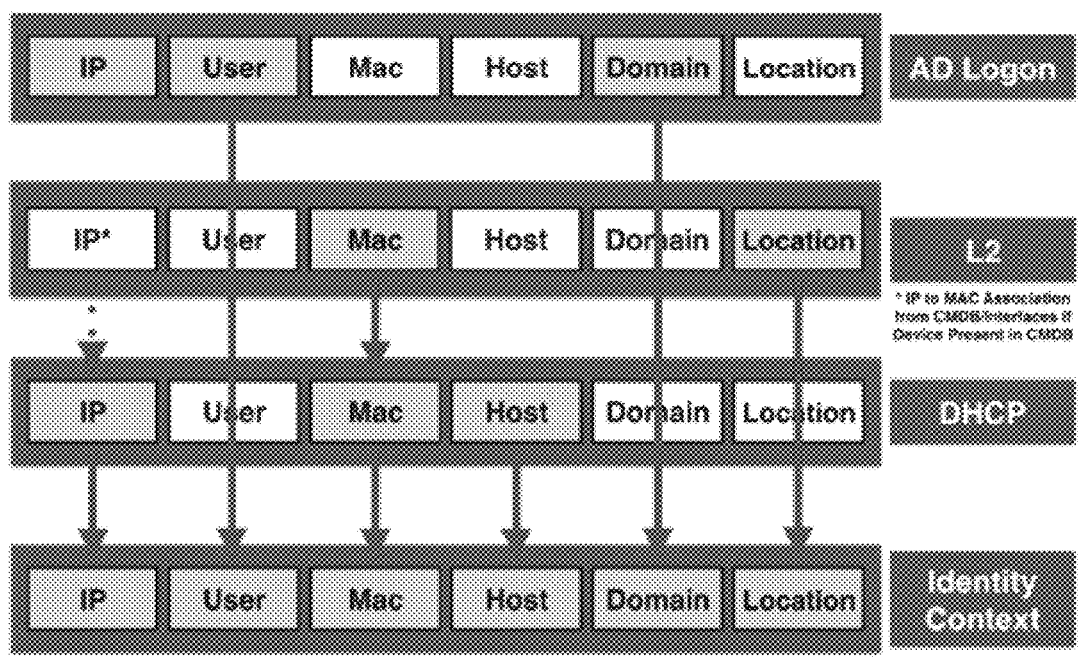
FIG. 4 is a block diagram illustrating an example of a user identity context derived from different log events, according to one embodiment.

To this end, FIG. 4 shows different log events having specific metadata that is added to an identity context. The Active Directory logon has an IP address, user, and domain, but not a MAC address, host address or location. The layer 2 routing table has a MAC address and a location, but not an IP address, a user, a host or a domain. Finally, the DHCP event metadata has an IP address, a MAC address and a host, but not a user, a domain or a location. In the aggregate, an identity context is generated by merging data fields from different types of data for a more complete picture. Then subsequent events are matches up to the record for location updates.

The user location module 330 tracks the location field to determine a location. If an explicit location is not provided, inference can be made through the geo-location look-up server which stores locations of well-known IP addresses, privately acquired IP addresses, ISP IP addresses, previously determined IP addresses, and the like.

Figure 5:
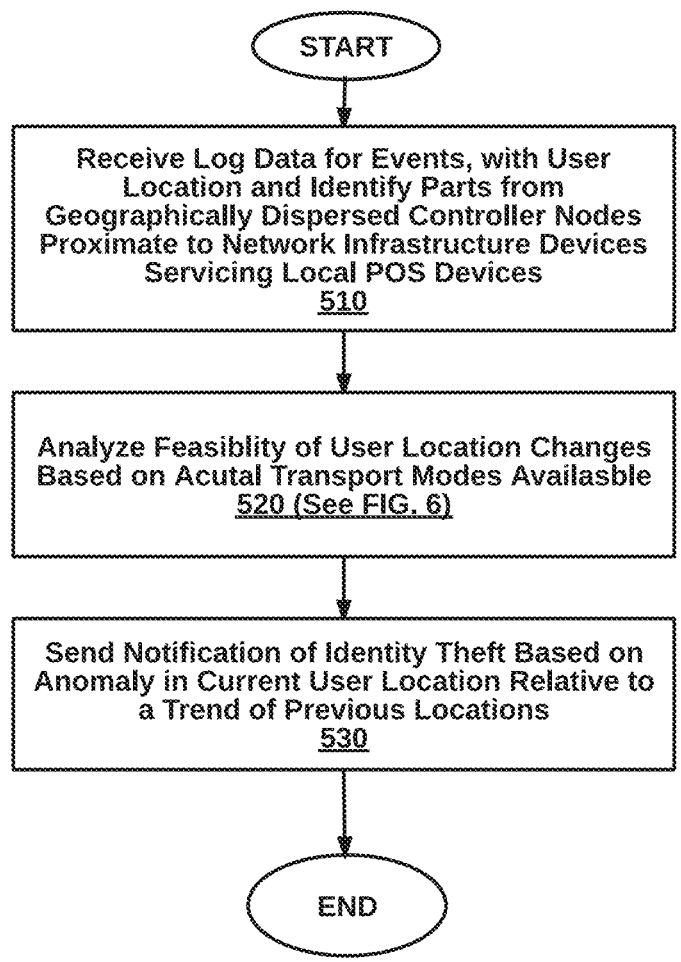
FIG. 5 is a high-level flow diagram illustrating a method for detecting identity fraud from reported log event, according to one embodiment.
Figure 6:
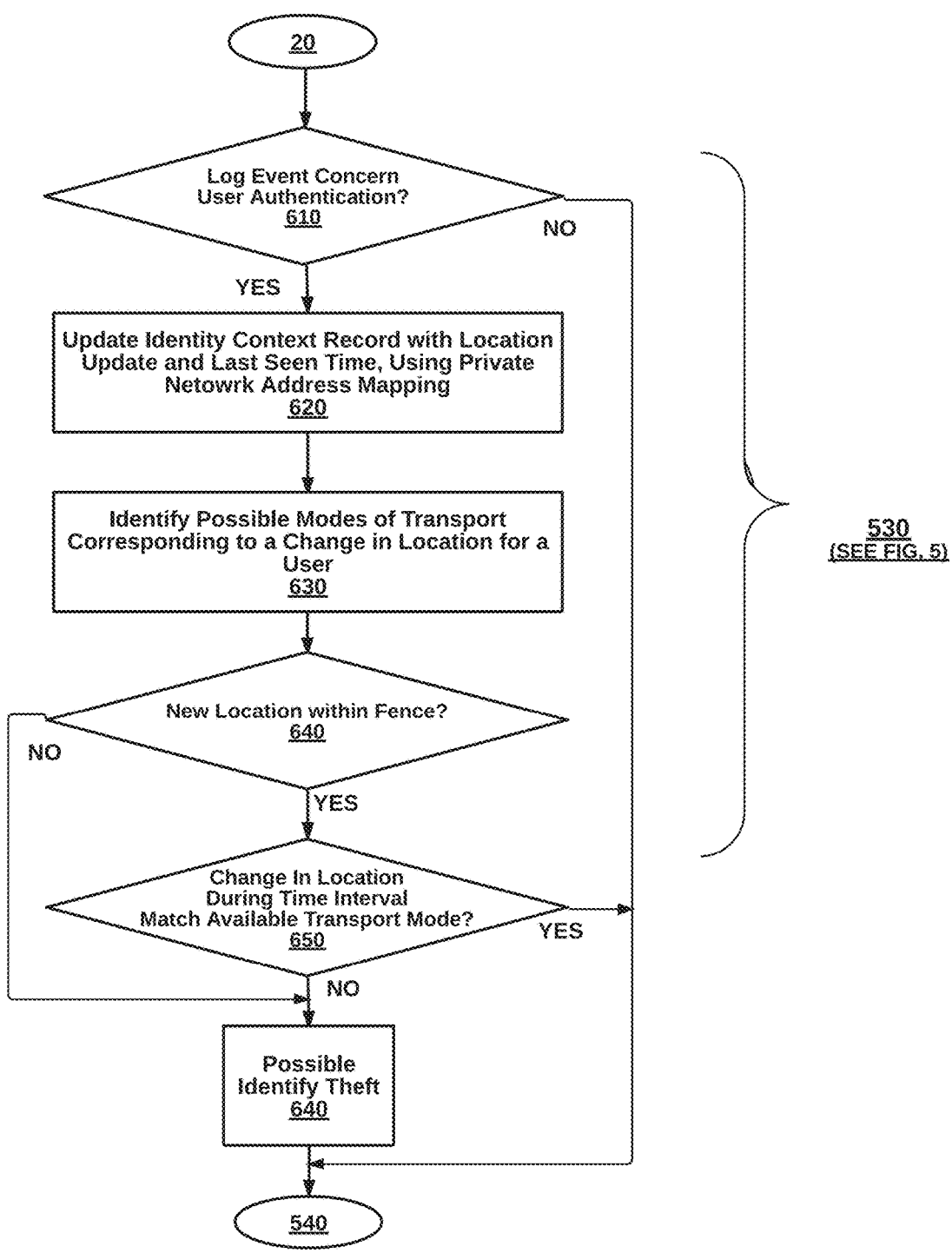
FIG. 6 is a more detailed flow diagram illustrating a step of, analyzing feasibility of user location changes based on actual transport modes available, from the method of FIG. 5, according to one embodiment.

Methods for Preventing Identify Fraud Using Log Events (FIGS. 5-6)

FIG. 5 is a high-level flow diagram illustrating a method 500 for tracking of users and devices at collector nodes, according to one embodiment. The method 500 can be implemented by the system 100 of FIG. 1 or a different system. One of ordinary skill in the art will recognize that the method 500 is non-limiting as other embodiments can have more or less steps and can be performed in a different order.

At step 410, log data for events is received with user location and identity parts from geographically-dispersed controller nodes proximate to network devices servicing local POS devices. At step 420, feasibility of user location changes is analyzed based on actual (or scheduled) transport modes available, as detailed in FIG. 5. At step 530, notifications of identity theft are sent based on an anomaly in current user location relative to a last seen location, or a trend of previous locations considered in combination.

FIG. 6 is a more detailed flow diagram illustrating a step 530 of performing network security actions based on location anomalies from the method of FIG. 5, according to one embodiment.

At step 610, if a log even concerning user authentication is identified, an identity context record is updated with a location update and a last seen time, at step 620. At step 630, possible modes of transport corresponding to a change in location are identified. At step 640, if the location is within an optional geographical fence, the change in location is analyzed at step 650 to identify possible identity theft, at step 640, when the change in location does not comply with identity theft rules. Otherwise, the process returns to step 540 to without any flags for notifications to be sent.

Generic Computing Device (FIG. 7)

FIG. 7 is a block diagram illustrating an exemplary computing device 700 for use in the system 100 of FIG. 1, according to one embodiment. The computing device 700 is an exemplary device that is implementable for each of the components of the system 100, including the central log manager 110, the collector nodes 120, and the network devices 130A-D. The computing device 700 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 700, of the present embodiment, includes a memory 710, a processor 720, a storage drive 730, and an I/O port 740. Each of the components is coupled for electronic communication via a bus 799. Communication can be digital and/or analog, and use any suitable protocol.

The memory 710 further comprises network applications 712 and an operating system 714. The network applications 712 can include the modules of the central log manager 110, the collector nodes 120, and the network devices 130A-D, as illustrated in FIGS. 1-3. Other network applications 712 can include a web browser, a mobile application, an application that uses networking, a remote application executing locally, a network protocol application, a network management application, a network routing application, or the like.

The operating system 714 can be one of the Microsoft Windows® family of operating systems (e.g., Windows 95, 98, Me, Windows NT, Windows 2000, Windows XP, Windows XP x74 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX74. Other operating systems may be used. Microsoft Windows is a trademark of Microsoft Corporation.

The processor 720 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 720 can be single core, multiple core, or include more than one processing elements. The processor 720 can be disposed on silicon or any other suitable material. The processor 720 can receive and execute instructions and data stored in the memory 710 or the storage drive 730.

The storage drive 730 can be any non-volatile type of storage such as a magnetic disc, EEPROM (electronically erasable programmable read-only memory), Flash, or the like. The storage drive 730 stores code and data for applications.

The I/O port 740 further comprises a user interface 742 and a network interface 744. The user interface 742 can output to a display device and receive input from, for example, a keyboard. The network interface 744 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method for a log management server in a SIEM (security information and event management) system on a data communication network for detecting identity fraud from log event reporting data, the method comprising:
   receiving metadata for different log events, from a plurality of regional controller nodes, implemented at least partially in hardware and geographically-dispersed around the data communication network for proximity to network devices, each of the log events being reported by the network devices to a regional collector node of the plurality of regional controller nodes;
   detecting log events concerning a user authenticating to a network device that is geographically proximate to the user and comprising at least user identity aspect and a location aspect for specific users of stations serviced by the network devices;
   responsive to the detected log events, parsing the metadata for each of the detected log events to expose part of an identity context and a current location;
   matching the identity context part with one or more previous identity context parts of a specific user record for each of the reported events based on user identity aspects of the identity context part;
   determining a location and a log event time for the specific user based on user location aspect of the parsed log data, the determination comprising at least a mapping for a public IP address to a private MAC address exposed by a regional collector node;
   updating a specific user identity context record for the user of a plurality of user identify context records with the location and the log event time, the specific user identity context comprising at least one previous location and at least one previous time;
   identifying possible modes of transport by comparing the location for the specific user to a trend of previously determined user locations for the specific user stored in relation to previously reported log events to calculate a change of location over time;
   analyzing identified possible transport modes against actually available for the user between the location and past locations, during a period between the log event time and at least one previous log event time; and
   responsive to identifying an anomaly between the possible modes of transport and the actual available modes of transport available for the user between the location and the at least one previous location, sending a notification of potential identify theft.

2. The method of claim 1, wherein the regional collector node performs the step of parsing the metadata for detected log events by mapping for the public IP address to the private MAC address stored in a routing table of the regional collector node.

3. The method of claim 1, further comprising:
   detecting that at least one user location of a log event involves a financial transaction at a point of sale;
   responsive to point of sale detection, retrieving an identity theft policy,
   wherein the identify theft policy comprises parameters to define possible transport modes.

4. The method of claim 1, further comprising:
   identifying the actually available modes of transport by retrieving a schedule of anticipated or actual departures and arrivals between the location and the past location.

5. The method of claim 1, wherein the log management server is operated as a third-party service to privately-owned regional collector nodes.

6. The method of claim 1, wherein the log management service is integrated with the regional collector nodes under a common entity.

7. The method of claim 1, wherein the log event sourcing metadata comprises at least one of: a Windows or Unix logon event, an Active Directory logon event, a layer 2 forwarding table event, a layer 3 routing table event, a firewall event, a DHCP log event, a VPN authentication event, a VOIP phone event, and a wireless LAN event.

8. The method of claim 7, wherein the parsed metadata comprises at least one of a source IP address, a source MAC address, a source device name, a host IP address, a host MAC address, a host name, a domain user, a VPN user, and an AAA authenticated user.

9. The method of claim 1, further comprising:
   receiving a list of previously determined user locations; and
   determining the trend of previously determined user locations.

10. The method of claim 1, further comprising:
    determining the previously determined user locations from previously received log data for events; and
    determining the trend of previously determined user locations.

11. The method of claim 1, further comprising:
    detecting a merge condition based on isolating a part of a previously stored user identity context for a specific user that is distinct from the user identity context currently associated with the specific user; and
    merging the isolated part of the user identity context with the previously stored user identity context responsive to the merge condition detection.

12. The method of claim 1, further comprising:
    updating the user context database if all relevant metadata is the same in the subsequently received event logs for a particular user or device.

13. The method of claim 1, further comprising:
    updating the user context database responsive to receiving metadata that matches predefined fast update rules for a particular user or IoT apparatus.

14. The method of claim 1, further comprising:
    bypassing an update from a regional collector node to the log management server responsive to duplicative information.

15. The method of claim 1, wherein identifying the anomaly comprises:
    identifying the anomaly in by retrieving and applying an identity theft rule associated with the specific user, the rule restricting allowable locations for the specific user.

16. The method of claim 1, wherein identifying the anomaly comprises:
    identifying the anomaly by retrieving and applying a rule associated with the specific user, the rule restricting allowable devices that can be associated with the specific user.

17. The method of claim 1, wherein identifying the anomaly:
    identifying the anomaly by retrieving and applying a rule associated with the specific user, the rule restricting allowable financial transactions for the specific user.

18. A non-transitory computer-readable medium to, when executed by a processor, perform a computer-implemented method in a SIEM (security information and event management) system on a data communication network for detecting identity fraud from log event reporting data, the method comprising:

receiving metadata for different log events, from a plurality of regional controller nodes, implemented at least partially in hardware and geographically-dispersed around the data communication network for proximity to network devices, each of the log events being reported by the network devices to a regional collector node of the plurality of regional controller nodes;

detecting log events concerning a user authenticating to a network device that is geographically proximate to the user and comprising at least user identity aspect and a location aspect for specific users of stations serviced by the network devices;

responsive to the detected log events, parsing the metadata for each of the detected log events to expose part of an identity context and a current location;

matching the identity context part with one or more previous identity context parts of a specific user record for each of the reported events based on user identity aspects of the identity context part;

determining a location and a log event time for the specific user based on user location aspect of the parsed log data, the determination comprising at least a mapping for a public IP address to a private MAC address exposed by a regional collector node;

updating a specific user identity context record for the user of a plurality of user identify context records with the location and the log event time, the specific user identity context comprising at least one previous location at least one previous time;

identifying possible modes of transport by comparing the location for the specific user to a trend of previously determined user locations for the specific user stored in relation to previously reported log events to calculate a change of location over time;

analyzing identified possible transport modes against actually available for the user between the location and past locations, during a period between the log event time and at least one previous log event time; and responsive to identifying an anomaly between the possible modes of transport and the actual available modes of transport available for the user between the location and the at least one previous location, sending a notification of potential identify theft.

* * * * *